United States Patent [19]

Felegyhazi, Sr.

[11] Patent Number: 5,057,761

[45] Date of Patent: Oct. 15, 1991

[54] MEANS FOR DISTINGUISHING BETWEEN BATTERIES CAPABLE OF BEING FAST CHARGED AND OTHER BATTERIES AND FOR CHARGING SAME ACCORDINGLY

[75] Inventor: William B. Felegyhazi, Sr., North Olmsted, Ohio

[73] Assignee: Eveready Battery Company, Inc., St. Louis, Mo.

[21] Appl. No.: 463,546

[22] Filed: Jan. 11, 1990

[51] Int. Cl.⁵ .............................................. H02J 7/02
[52] U.S. Cl. ............................................ 320/2; 320/15
[58] Field of Search ...................... 320/14, 20, 22, 23, 320/21, 15, 2

[56] References Cited

U.S. PATENT DOCUMENTS

| | | | |
|---|---|---|---|
| 3,579,075 | 5/1971 | Floyd | 320/15 X |
| 4,268,243 | 12/1986 | Hodgman et al. | 320/2 |
| 4,303,876 | 12/1981 | Kelly, III et al. | 320/15 X |
| 4,403,182 | 9/1983 | Yeh | 320/2 |
| 4,549,127 | 10/1985 | Taylor et al. | 320/14 X |
| 4,691,157 | 9/1987 | McDermott | 320/2 |
| 4,766,361 | 8/1988 | Pusateri | 320/2 |
| 4,816,735 | 3/1989 | Cook et al. | 320/2 |

Primary Examiner—Steven L. Stephan
Assistant Examiner—Kristine Peckman
Attorney, Agent, or Firm—Robert W. Welsh

[57] ABSTRACT

A battery charger for charging secondary drycell type batteries having a compartment portion with positions for installing secondary drycell batteries to be charged, the drycell batteries having cylindrical bodies with terminals at both ends, the terminal at one end being centrally located, the compartment including an elongated channel having opposite ends, a contact at one end of the channel for engagement by the central terminal on batteries positioned therein and a spring biased plate member in the channel for engaging the terminal at the opposite end of the channel urging the centrally located terminal into engagement with the contact, the contact having an opening therethrough aligned with the centrally located battery terminal, and a switch with a switch actuating member positioned adjacent to the contact on one side of the opening, batteries having centrally located terminals that are small enough to move through the opening in the contact moving against and actuating the switch actuator member to actuate the switch. The subject battery charger may also include contact member located in one portion of the channel for engaging the outer surface of a certain batteries positioned therein at an intermediate location for the purpose of determining continuity and reading a battery voltage to determine if the battery should be fast or slow charged or not charged.

15 Claims, 3 Drawing Sheets

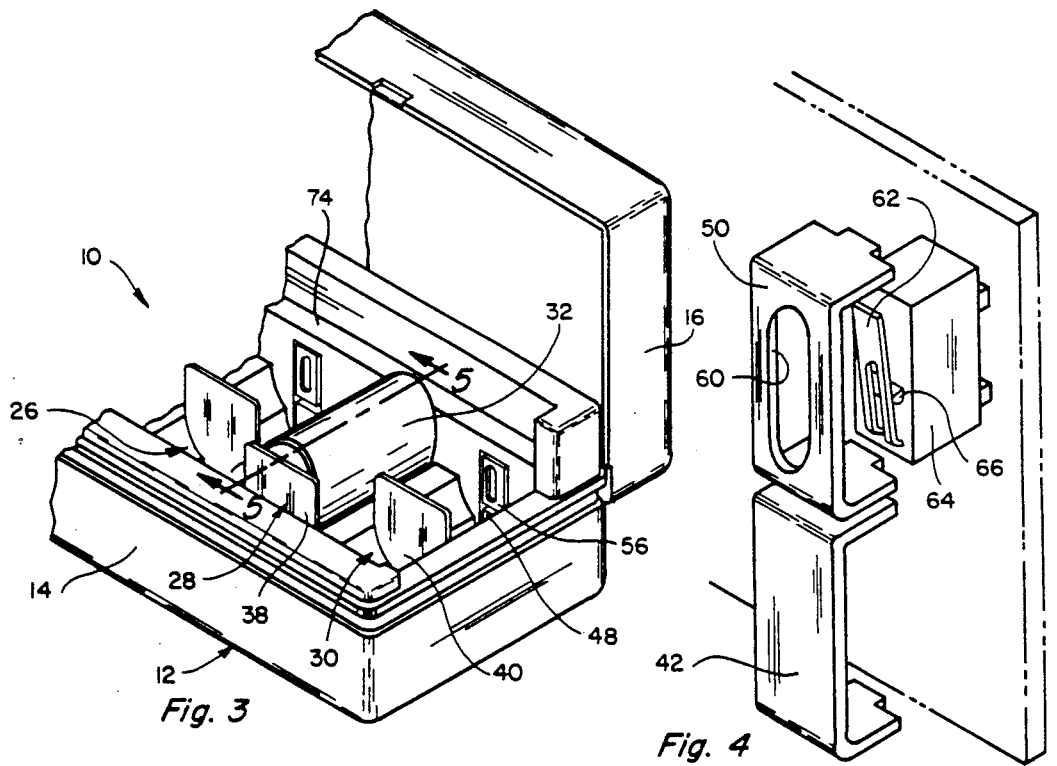
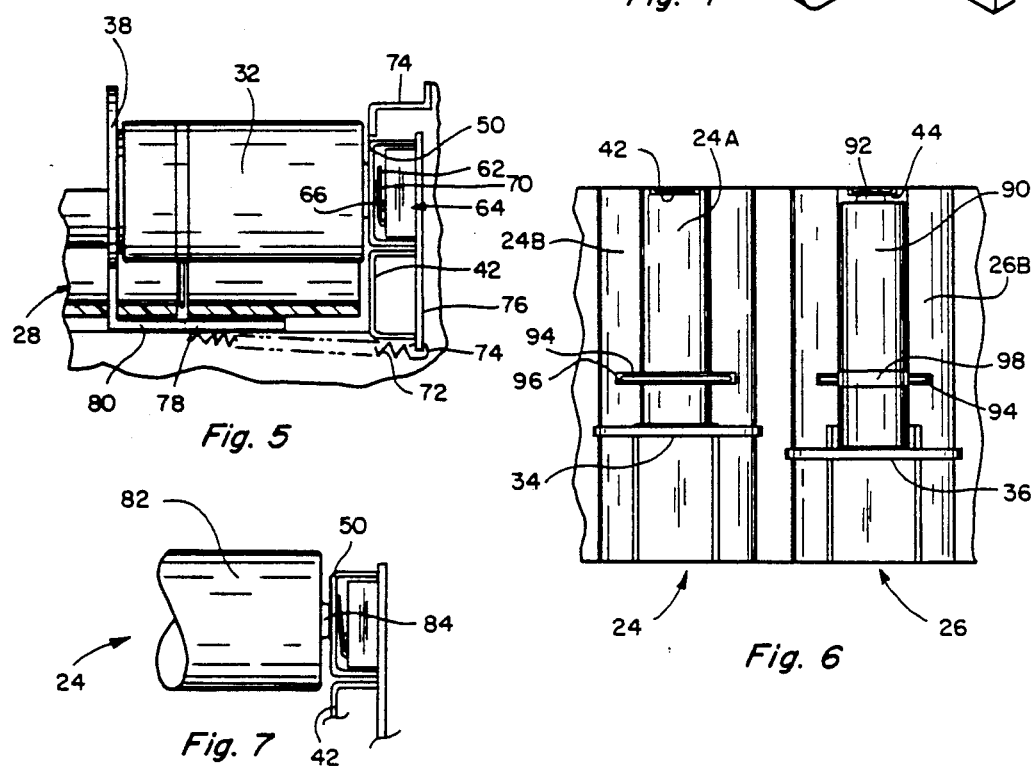

MEANS FOR DISTINGUISHING BETWEEN BATTERIES CAPABLE OF BEING FAST CHARGED AND OTHER BATTERIES AND FOR CHARGING SAME ACCORDINGLY

BACKGROUND OF THE INVENTION

There are in existence numerous devices for charging batteries including drycell batteries of the AA, C and D types wherein one or more batteries to be charged are positioned in the charging device which is connected to or plugged into a source of charging energy. Some batteries require a fairly long charging period, typically fourteen (14) hours or longer while other batteries have been developed including nickel-cadmium batteries which can be fast charged, sometimes in an hour or less. Those batteries that require the longer charging periods are generally of the same overall physical size and shape as batteries which can be fast charged but the fast charge batteries are usually distinguishable in some way such as by having narrower positive terminals or bushings. It is therefore incumbent on those building battery chargers capable of charging both types of batteries to provide means for distinguishing batteries which can be fast charged from those that can be charged only at a slower rate. The present invention teaches the construction of a battery charger having novel means for distinguishing batteries which can be fast charged from those which cannot, and for controlling the battery charger so that the charger will charge a battery positioned therein at the required charging rate depending upon the type of battery that it is. The present charger may also include means to control whether certain batteries can receive a charge.

The closest known prior art to the present construction is disclosed in U.S. Pat. Nos. 3,391,321 (Otu), 3,579,075 (Floyd), 4,403,182 (Yek), 4,577,144 (Hodgman et al), 4,645,996 (Toops), and 4,816,735 (Cook et al).

In order to physically distinguish between batteries that can be fast charged from those that cannot, the fast charge batteries of the type chargable in the present charger are constructed to have their positive terminals or bushings which protrude from the center of one end of the battery of a different, preferably smaller, diameter than the diameter of the positive terminals on batteries which cannot be fast charged. The smaller diameter positive terminals on the fast charge batteries are used in the present battery charger to actuate switch means such as microswitch means to establish a circuit condition in the charging circuit which enables any such battery to be charged at the faster rate. Those batteries which cannot be fast charged, which have the larger diameter positive terminals, will not be able to actuate the switch means and therefore the charger circuit will only be able to charge these batteries at a more conventional slower charging rate. Since the conventional batteries need to be charged at a slower rate than the faster rate they will not be damaged by having the slow charging rate applied to them. On the other hand those batteries which are capable of being fast charged will be able to actuate associated switch means to establish the circuits or circuit conditions necessary to fast charge them. This distinction will be made automatically when the batteries are installed in the battery charger. The present invention therefore is directed to providing means on a battery charger for distinguishing batteries that can be fast charged from batteries that cannot be fast charged, and the means for doing so establish circuit conditions which will produce the desired charging rate for each battery installed so that both fast and slow charge batteries can be charged simultaneously but at different rates as required for each.

The present battery charger may have means for accommodating a plurality of batteries to be charged simultaneously and the size or diameter of the positive battery terminals, as aforesaid, will be used to control the charging rate for certain batteries positioned in the charger.

The present battery charger has a compartment with positions for installing a plurality of batteries including the possibility of installing batteries of different sizes as well as different charging rates to be charged. For example, the same compartment can accommodate AA, C, and D batteries in each position. In the case of the AA batteries the charger may also have optional special provision for checking a battery voltage or a battery continuity of each such battery to see if it is even capable of being charged. If a certain battery voltage is within a predetermined voltage range such as greater than zero volts, it indicates that battery can be charged and the circuits for doing so will be established. If not, the circuit is controlled to prevent charging. It is expected however that all batteries will receive a charge for a short period of time such as for a few cycles before a determination is made as to whether the battery voltage is such that the battery can be charged or not.

The closest known prior art to the idea of measuring a battery voltage (or battery continuity) using an electrical contact to make contact to an intermediate location on the battery housing are disclosed in U.S. Pat. Nos. 3,506,902 (Sullivan) and 4,628,243 (Hodgeman et al) and in pending U.S. Pat. application Ser. No. 377,370, filed July 7, 1989 and assigned to Applicant's assignee.

No known battery charger is capable of accommodating and charging a plurality of the same or of different size batteries some or all of which are capable of being fast or slow charged and to do so simultaneously and individually depending upon the types of batteries involved. The closest known prior art to a device having such features in combination is disclosed in Johnson et al U.S. Pat. Application Ser. No. 248,962, filed Sept. 26, 1988 and assigned to Applicant's assignee. The prior art construction is able to charge a plurality of batteries simultaneously but it has no means for distinguishing between those batteries that can be fast charged from those that must be slow charged, and simultaneously charging all such batteries at their own respective charging rates and has no means for determining that certain batteries of one type are capable or not of being charged based on a battery voltage or continuity measured from a contact at an intermediate location on the battery.

SUMMARY OF THE INVENTION

The present invention resides in a battery charger having a compartment in which a plurality of batteries to be charged are to be installed. The device includes means in the compartment for distinguishing between those batteries capable of being fast charged and those that are not capable of being fast charged based on a physical characteristic of the batteries such as on the diameter of the positive battery terminal or bushing. More specifically the present invention is directed to the use of switch means capable of being activated by the positive terminal of certain batteries and not others and includes circuit means which establish the desired charging rate based on whether the switch means are actuated or not. If a battery actuates a switch when installed in the compartment it will be fast charged, otherwise the battery will be charged at another rate. The present charger may optionally also have means to sense a battery voltage or continuity for some types of batteries to determine if they are even capable of being charged.

It is a principle object of the present invention to provide means in a battery charger for distinguishing batteries that can be fast charged from those that cannot.

Another object is to provide means for distinguishing between batteries based on a physical characteristic of the battery itself such as on the diameter of the positive battery terminal.

Another object is to provide a battery charger capable of simultaneously charging secondary drycell batteries of different physical dimensions and capacities regardless of whether they are to be fast or slow charged.

Another object is to Provide a battery charger that is relatively foolproof in that it does not rely on the person installing batteries in the charger to determine whether a battery is to be fast or slow charged.

Another object is to provide relatively simple inexpensive means for mounting in the compartment portion of a battery charger to enable the charger to distinguish batteries which can be fast charged from those which cannot.

Another object is to establish circuit conditions to meet the charging requirements of a battery simply by installing the battery to be charged in a charger.

Another object is to provide means in a battery charger to determine whether a battery should be charged based on a battery continuity or voltage.

These and other objects and advantages of the present invention will become apparent after considering the following detailed specification covering a preferred embodiment of the subject invention in conjunction with the accompanying drawings.

BRIEF DESCRIPTION OF THE DRAWINGS

FIG. 3 is a fragmentary perspective view of a portion of the battery compartment on the subject battery charger showing a battery in one position;

FIG. 4 is an exploded perspective view showing the construction of the mechanism in one position of the subject compartment portion of a battery charger for engagement with the positive terminal of a battery to be charged;

FIG. 5 is an enlarged cross-sectional view taken on line 5—5 of FIG. 3;

FIG. 6 is a fragmentary top plan view showing two battery positions in the compartment portion of the subject charger, a AA type battery being shown in one position;

FIG. 7 is a fragmentary cross-sectional view taken along a line similar to FIG. 5 and showing a battery positioned in one position of a type that can only be slow charged.

DETAILED DESCRIPTION OF PREFERRED EMBODIMENTS

Figure 1:
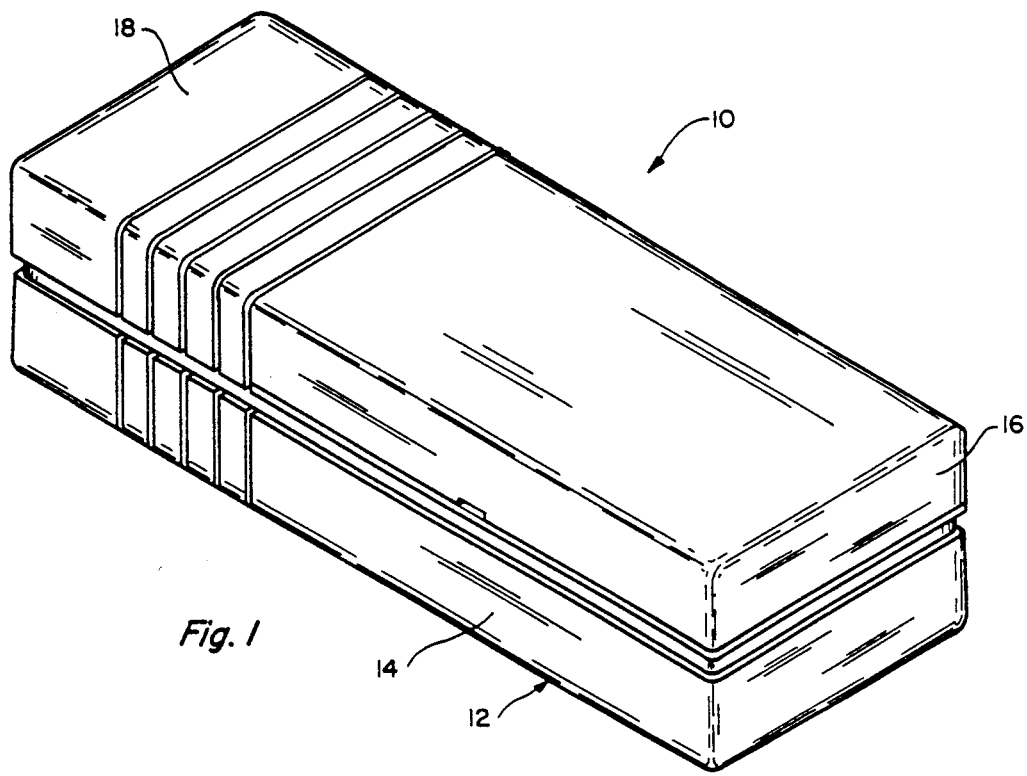
FIG. 1 is a perspective view of a battery charger incorporating the features of the present invention.
Figure 2:
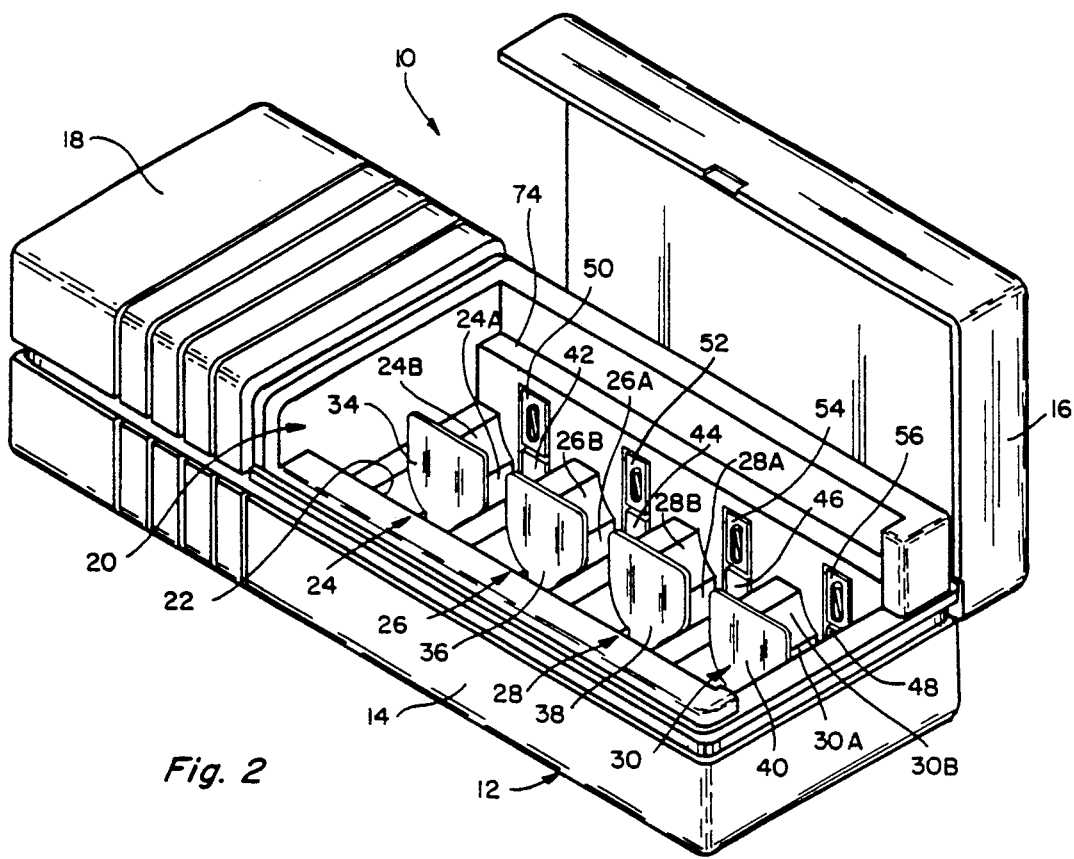
FIG. 2 is a perspective view of the same battery charger shown in an open condition.

Referring to the drawings more particularly by reference numbers, number 10 in FIGS. 1 and 2 refers to a battery charger incorporating the teachings of the present invention. The battery charger 10 is shown having a molded plastic case or housing 12 with a base portion 14 and a hinged closure member 16 mounted closing one end portion thereof. The closure member 16 is movable between the closed positioned as shown in FIG. 1 and the open position shown in FIG. 2. The charger case 12 also has a closed end portion 18 in which the circuitry for the charger is located. The battery charger 10 includes a battery compartment portion 20 which includes a cavity 22 that is exposed when the closure member 16 is opened. The compartment 20 is shown in FIG. 2 having four (4) positions 24, 26, 28 and 30 where batteries such as battery 32 (FIG. 3) can be installed for charging.

Each of the different battery positions 24–30 includes several grooved or rounded bottom portions or surfaces including a grooved portion formed by a relatively small diameter rounded portion 24A–30A and two spaced larger diameter rounded portions 24B–30B on opposite sides of the portions 24A–30A for accommodating larger diameter batteries. The smaller diameter portions 24A–30A are constructed to accommodate AA type batteries and the larger diameter rounded portions 24B–30B are shaped to accommodate larger diameter batteries such as C and D type batteries. The smaller diameter AA batteries have centrally located positive terminals on one end, and rear end surfaces which make contact with a movable spring biased plate such as the plates 34, 36, 38 and 40 in the respective compartment positions 24–30. The plates 34–40 are spring-biased toward one end of the respective positions 24–30 as shown in FIG. 2 and are positioned so as to apply force against the rear or negative end of the respective batteries moving them in the respective grooves toward the opposite or positive ends thereof under spring tension. The plates 34–40 also provide electrical connections to the rear or negative battery terminals in contact therewith.

The positive voltage end of each battery position is provided with a respective terminal plate 42, 44, 46 and 48 for contact by AA type batteries. When the smaller diameter AA batteries are positioned in the respective positions 24A–30A it will be necessary to move the respective plates 34–40 away from the positive terminal end against spring tension in order to position the batteries in their charging positions 24A–30A after which the plates 34–40 are released so that they will apply pressure on the respective batteries and on the positive battery terminals against the respective terminals 42–48. The AA batteries are now in position to be charged. When charging AA batteries, however, the subject device also has means for sensing a certain battery voltage or continuity of each such battery to determine if it suitable or capable of being charged at the fast rate. The means for accomplishing this will be described later in connection with FIG. 6.

If a larger diameter battery such as a C or D battery is positioned in the respective compartment Positions 24–30 they will be too large in diameter to extend downwardly into the groove portions 24A-30A but instead will engage and be supported by the larger diameter groove portions 24B-30B as shown in FIGS. 2 and 6. The C and D batteries are too large to have their positive terminals engage the terminals 42-48 engaged by AA batteries and instead they will engage other respective terminals 50, 52, 54 and 56 positioned respectively above the terminals 42-48. The construction of the terminals 50, 52, 54 and 56 is important to the present invention because they have means associated with them for distinguishing between C and D batteries that are capable of being fast charged and those only capable of being slow charged.

FIG. 4 is an exploded view of the positive terminal of the battery charger for compartment position 24. As stated the terminal 42 is for engaging the positive terminal of AA batteries and is suitably connected into the circuit as will be described in connection with FIG. 8. The terminal 50 in the corresponding compartment position is for engaging the positive terminals on C and D batteries. The terminal 50 is shown having a central elongated opening 60 which is elongated in the vertical direction to be able to cooperate with the positive terminals on C and D batteries that are constructed to accept a fast charge. The width of the opening 60 is precisely dimensioned and positioned in front of operating member 62 of a switch shown as microswitch 64. The microswitch 64 also has an actuating member 66 against which the operating member 62 is positioned. When the member 62 is in its inoperative condition as shown it will extend outwardly far enough so that the switch actuator 66 will also be in its outwardly extending deactivated condition. The switch 64 is mounted behind the terminal 50 in position such that the operating member 62 is spaced closely behind the opening 60, and in its inoperative position may rest against the rear surface of the terminal 50. The size and especially the width of the terminal opening 60 are important to the invention since the width dimension is selected such that it will permit the positive terminals on C and D type batteries that are capable of being fast charged to pass through but will not permit the positive terminals on C and D batteries that are not able to be fast charged to pass through. This is because the positive terminals on batteries that are not able to be fast charged have too large a diameter. This means when a conventional slow charge battery is positioned in any one of the compartment positions 24, 26, 28 and 30 its positive terminal will abut the front surface of the terminal 50 but will not be able to enter the respective opening 60 to move the operator member 62 and thereby actuate the switch 64.

FIG. 5 shows a C (or D) battery 32 capable of being fast charged positioned in compartment position 28. In this case the smaller diameter positive battery terminal 70 is able to extend through the opening 60 and into engagement with the operator member 62 which moves or pivots to the right as shown to cause the switch actuator 66 to actuate the switch which is shown as microswitch 64. When the battery 32 is positioned as shown in FIG. 5 the spring biased plate 38 moves against the rear end or negative terminal of the battery 32 moving the battery in a direction to maintain the positive terminal 70 engaged with the operator member 62 to keep the switch 64 in its activated condition. The spring biased plate 38 is maintained in its biased position by coil spring 72 which has one end 74 connected to a fixed wall 76 on the battery charger and its opposite end connected to a tab 78 on leg 80 of the plate 38.

In FIG. 7, battery 82, which is a slow charge battery, has its positive terminal 84 larger in diameter than the positive terminal 70 of the battery 32, and therefore it will not be able to enter the opening 60 but will still rest against the terminal 50. The fact that the battery 82 is not able to be fast charged is made known to the battery charger 10 by the fact its positive terminal 84 is too large to pass through the opening 60 in the contact member or terminal 50 (FIG. 4) so as to move the switch operating member 62. However, the fact that the plates 34-40 are spring biased into engagement with the respective batteries means that the battery charger is able to accommodate batteries of different sizes and lengths including also different diameter positive terminals and maintain them engaged under pressure with the positive terminal 50 of the battery charger. This is important because it means that all batteries including fast and slow charge batteries are in charging condition when positioned in each compartment position.

FIG. 6 is a top plan view showing the compartment positions 24 and 26 with an AA battery 90 positioned in compartment position 26. In this view the positive battery terminal 92 is engaged with the terminal 44. Also shown in FIG. 6 is the provision of a curved bare wire member 94 which is positioned in a slot or groove 96 that extends between spaced openings, one such wire member being located in each of the groove portions 24A-30A. The bare wires 94 as shown are positioned so that they extend transversly above the bottom of or into the groove portions 24A-28A but not above the contour formed by the groove portions 24B-28B. This means that when a AA battery is positioned in one of the compartment positions 24-28 its outer surface at an intermediate location therealong will engage the bare wire 94. However when a C or D battery is positioned in the corresponding groove position 24B (or 26B-30B) the bare wire 94 will not be able to make contact therewith. Some AA batteries will have an annular conductive band 98 located on their outer surfaces to be aligned with the location where the wire 94 is so that it will be in electrical contact therewith when such a battery is installed. When a AA battery is so positioned the battery charger circuit will be able to sense or read the circuit continuity appearing between the respective bare wire 94 and the negative battery terminal. If the device is able to sense continuity between the conductor band 98 and the negative battery terminal it means that the AA battery is able to be fast charged. If no continuity is sensed it means that the battery is not capable of being fast charged and will be slow charged or not charged at all.

Figure 8:
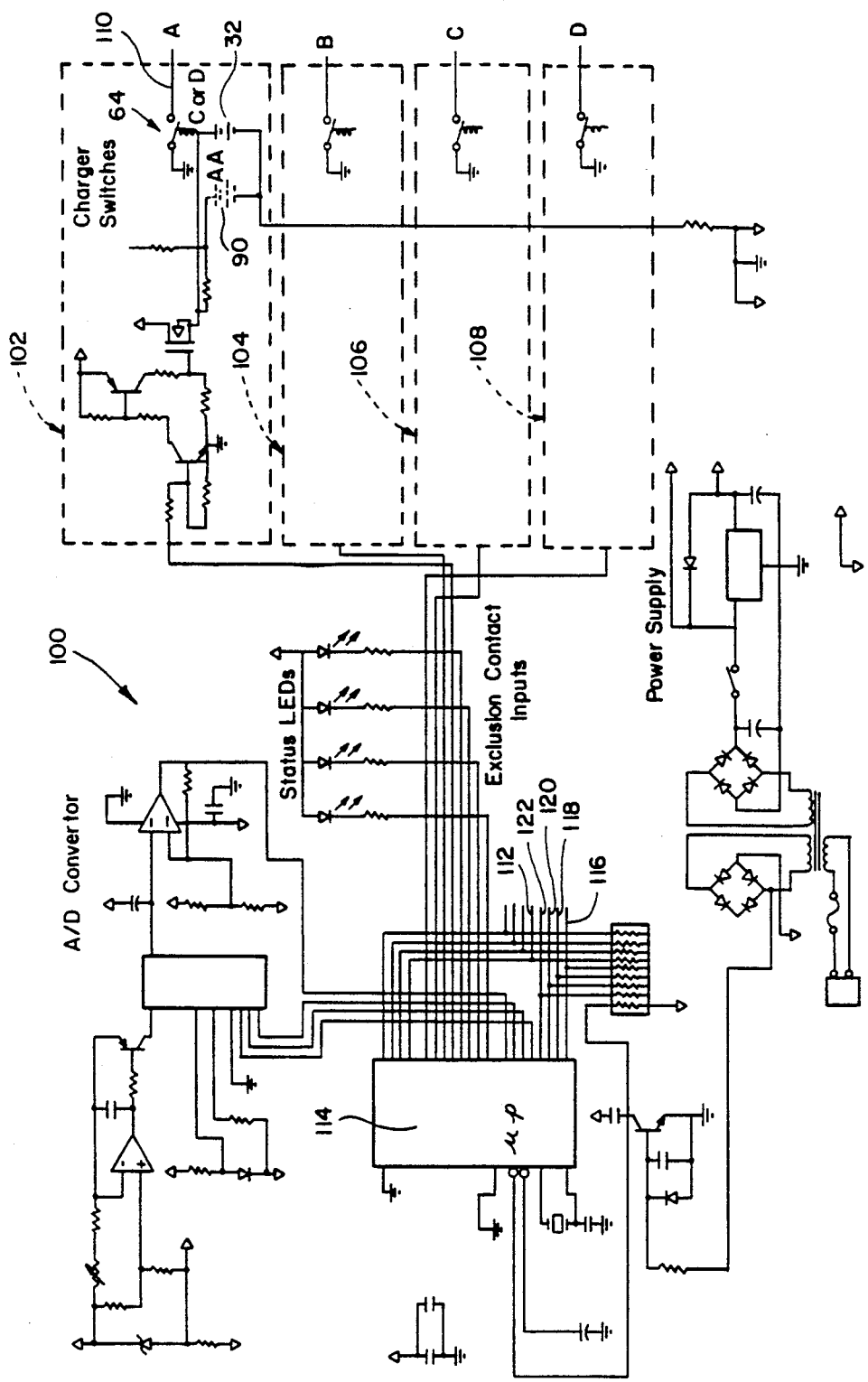
FIG. 8 is a schematic circuit diagram of a battery charger capable of fast and slow charging secondary drycell type batteries.

FIG. 8 is a circuit diagram 100 for the subject battery charger with the major portions of the circuit identified by appropriate legends. The circuit 100 has four similar circuit portions 102, 104, 106 and 108 corresponding to the battery compartment positions 24, 26, 28 and 30. Each of the circuit portions 102-108 includes a switch similar to the switch 64. The switch 64 in the first position is shown in its normally open deactivated condition. When a fast charge C and D battery is positioned in the first compartment position 24 its positive terminal 70 will operate to close the switch 64 causing a signal on lead 110 to be applied as an input on lead 112 to microprocessor 114. If a battery incapable of being fast charged is positioned in the position 24 the switch 64 will not be activated and no such signal will be sent to the microprocessor 114. This means that the battery will be slow charged. The slow charge condition is the normal charging condition for the circuit and will cause a slow charge to be applied to a C or D battery.

The slow charge circuit for AA, C and D batteries is through the circuits such as those shown in the dotted outline 102. The same circuit is used for fast and slow charging, and the microprocessor 114 controls the charge rate by adjusting the duty cycle which is a control of the percentage of time the charging circuit is turned on. The details of the charging circuits per se, except for the switches such as switch 64, are not part of the present invention. It is also possible to control the circuit by means other than a microprocessor.

The microprocessor 114 has other inputs 116-122 which are made to the various contact wires such as to the contact wire 94 (FIG. 6) in the smaller diameter compartment portions 24A-30A. If a AA battery is placed in one of these compartment positions and has its conductive band 98 exposed so as to make contact with the wire 94 in that position the microprocessor 114 will respond to the presence of the battery voltage between the band 98 and the positive battery terminal 92 by enabling a fast charge operation to occur. The program for the microprocessor that makes this determination for each AA battery is not part of the present invention as such.

Thus there has been shown and described a novel battery charger construction including novel means for determining and controlling the appropriate charging rate for each battery positioned therein, including in the case of some batteries whether or not the battery can receive a charge. Many changes, modifications, variations and other uses and applications for the subject invention are possible and contemplated, and all such changes, modifications, variations and other uses and applications which do not depart from the spirit and scope of the invention are deemed to be covered by the invention which is limited only by the claims which follow.

What is claimed is:

1. A battery charger having means to distinguish between batteries capable of being fast charged and batteries that should be slower charged comprising a housing having a compartment portion for installing a dry cell battery having a cylindrical body with terminals at both ends, one terminal being centrally located and extending outwardly from the body, said batteries being fast charged having central terminals of smaller diameter than other batteries, the compartment portion including an elongated channel having opposite ends, a contact at one end for engagement bby the central terminal of the one end of said battery, and spring biased plate means in the channel for engaging the terminal at the opposite end of the battery urging the central terminal against the contact, said contact having an opening therethrough in position to be aligned with the central battery terminal, said opening being large enough to admit the central terminals of said fast charge batteries but not of said other batteries therethrough, switch means having a switch actuator positioned adjacent to the contact on the opposite side thereof from the battery, said fast charge batteries having said central terminals that are small enough to move into the opening moving against the switch actuator and moving the switch actuator far enough to actuate the switch means associated therewith.

2. The battery charger of claim 1 wherein the switch means is a microswitch.

3. The battery charger of claim 1 wherein the battery is a C or D dry cell battery.

4. The battery charger of claim 1 wherein the channel has a first rounded portion shaped to accommodate C and D dry cell batteries and a small diameter second rounded portion for accommodating AA dry cell batteries, and a second contact at said one channel end for engagement by the central terminals on the ends of the AA batteries positioned in the second rounded portion.

5. The battery charger of claim 4 wherein the smaller diameter second rounded channel portion extends from the first rounded channel portion.

6. The battery charger of claim 4 including contact means positioned in the smaller diameter second rounded channel portion at an intermediate location therealong.

7. The battery charger of claim 6 wherein certain of said AA dry cell batteries have means on the surface thereof for making electrical contact with the contact means in the smaller diameter second rounded channel portion.

8. The battery charger of claim 1 including circuit means mounted in the housinng including a microprocessor having a plurality of control input connections, and means operatively connecting the contact to a selected one of the microprocessor control input connections.

9. The battery charger of claim 4 including circuit means mounted in the housing including a microprocessor having a plurality of control input connections, and means operatively connecting the contact means in the second rounded portion to a selected one of the control input connections of the microprocessor.

10. A battery charger having means to distinguish between batteries that are capable of being fast charged and batteries that cannot be fast charged, each of said batteries having a cylindrical body with an end surface battery terminal at one end and a centrally located battery terminal at the opposite end, said batteries capable of being fast charged having the centrally located terminals of smaller diameter than said batteries that cannot be fast charged, the improvement comprising a housing for the battery charger having a compartment therein for receiving said batteries to be charged, said compartment having a channel into which each of said batteries is positioned for charging, contact means at one end of the channel for cooperative engagement by the centrally located terminal, and yieldable means in the channel for engaging the end surface battery terminal and biasing the centrally located terminal of each of said batteries into engagement with the contact means, the contact means including a conductive strap member having an opening therethrough that is large enough to receive the centrally located terminals of said batteries capable of being fast charged but not of said other batteries, a switch having a switch actuator member positioned adjacent to the opening in the conductive member for operative engagement by the centrally located terminals of said batteries capable of being fast charged, the means in the channel for engaging the end surface battery terminals exerting sufficient force on said batteries engaged therewith in a direction to cause the centrally located terminals on said batteries capable of being fast charged to move the switch actuator far enough to actuate the switch.

11. The means of claim 10 wherein the channel in the compartment has a first surface portion for cooperatively engaging C or D batteries positioned therein and a second smaller diameter surface portion adjacent to the first surface portion for cooperatively engaging AA batteries positioned therein, the contact means at one end of the channel including a first conductive member engageable by the centrally located terminals on said AA batteries and a second conductive member adjacent to the first conductive member for engagement by the centrally located terminal on said C and D batteries, the opening being formed in the second conductive member.

12. The means of claim 11 wherein the second smaller diameter channel portion includes a contact member positioned at an intermediate location therealong for engaging the cylindrical bodies of said AA batteries positioned therein for making electrical contact therewith.

13. The means of claim 12 wherein certain of said AA batteries have an electrically conductive band formed at an intermediate location on the cylindrical body in position to make electrical contact with the contact member in the smaller diameter channel portion.

14. The means of claim 11 wherein the battery charger includes circuit means operatively connected to the first and second conductive members.

15. The means of claim 11 wherein the battery charger includes circuit means having a microprocessor with a plurality of control input connections, and means for connecting the first and second conductive members to selected ones of the control input connections.

* * * * *